US008229810B2

(12) United States Patent
Butera et al.

(10) Patent No.: US 8,229,810 B2
(45) Date of Patent: Jul. 24, 2012

(54) REALTIME BILLABLE TIMEKEEPER METHOD, SYSTEM AND APPARATUS

(76) Inventors: Cynthia S. Butera, Smithtown, NY (US); Celeste M. Butera, Huntington, NY (US)

( * ) Notice: Subject to any disclaimer, the term of this patent is extended or adjusted under 35 U.S.C. 154(b) by 1283 days.

(21) Appl. No.: 10/787,607

(22) Filed: Feb. 25, 2004

(65) Prior Publication Data

US 2005/0187839 A1   Aug. 25, 2005

(51) Int. Cl.
*G06F 15/02* (2006.01)
*G07C 1/10* (2006.01)

(52) U.S. Cl. ......................................................... 705/32
(58) Field of Classification Search ..................... 705/32
See application file for complete search history.

(56) References Cited

U.S. PATENT DOCUMENTS

| | | | | |
|---|---|---|---|---|
| 3,593,008 | A * | 7/1971 | De Witt et al. ................. | 705/11 |
| 5,388,211 | A * | 2/1995 | Hornbuckle ................. | 717/178 |
| 5,493,492 | A * | 2/1996 | Cramer et al. ................. | 705/32 |
| 5,646,839 | A * | 7/1997 | Katz ....................... | 379/142.11 |
| 5,963,912 | A * | 10/1999 | Katz ................................ | 705/7 |
| 5,991,742 | A | 11/1999 | Tran | |
| 6,289,317 | B1 * | 9/2001 | Peterson ........................... | 705/7 |
| 6,338,097 | B1 * | 1/2002 | Krenzke et al. ............... | 719/329 |
| 6,427,140 | B1 * | 7/2002 | Ginter et al. ..................... | 705/80 |
| 6,622,128 | B1 | 9/2003 | Bedell et al. | |
| 6,895,438 | B1 * | 5/2005 | Ulrich ........................... | 709/227 |
| 7,010,493 | B2 * | 3/2006 | Yamamoto et al. ............... | 705/1 |
| 7,233,919 | B1 * | 6/2007 | Braberg et al. .................. | 705/32 |
| 7,577,571 | B2 * | 8/2009 | Yui .................................... | 705/1 |
| 7,620,162 | B2 * | 11/2009 | Aaron et al. .................... | 379/111 |
| 7,623,985 | B2 * | 11/2009 | Finch et al. .................... | 702/178 |
| 2001/0042032 | A1 * | 11/2001 | Crawshaw et al. ............. | 705/32 |
| 2002/0069145 | A1 * | 6/2002 | Collado et al. .................. | 705/32 |
| 2002/0174134 | A1 * | 11/2002 | Goykhman ............... | 707/104.1 |
| 2003/0069815 | A1 * | 4/2003 | Eisenberg et al. ............. | 705/32 |
| 2003/0074286 | A1 * | 4/2003 | Rodrigo ........................ | 705/32 |
| 2003/0225989 | A1 | 12/2003 | Licalsi | |
| 2004/0019542 | A1 * | 1/2004 | Fuchs et al. ..................... | 705/32 |
| 2004/0024666 | A1 * | 2/2004 | Walker et al. ................... | 705/32 |
| 2005/0021429 | A1 * | 1/2005 | Bates .............................. | 705/32 |

OTHER PUBLICATIONS

"Accu-Sort Shows New Shop Floor Data Collection System That Combines Flexibility, Simplicity, and Economy." Accu-Sort System, Inc.Journal, Nov. 1, 1988.*
www.sphericaltech.com/automatic-timesheet.asp.
www.sphericaltech.com/timesheet-logger-faq.asp.

* cited by examiner

*Primary Examiner* — Matthew S. Gart
*Assistant Examiner* — Oluseye Iwarere
(74) *Attorney, Agent, or Firm* — Tony V. Pezzano; King & Spalding (57) ABSTRACT

A computer method, system and apparatus for generating and tracking time expended by professionals in providing services to their clients on a realtime basis with all services performed through use of a computer including the realtime tracking and generation of billing entries with respect to the daily generation of Internet-based and local area network (LAN) documents and other Internet-based services such as preparation of e-mails and legal research, through integration with existing computer-based systems and programs.

40 Claims, 10 Drawing Sheets

TIMEKEEPER ENTRY BOX™

Date — 610
Client Identifier — 620
Personal Code — 630
Document Type — 640
Author(s) — 650
Recipient(s) — 660
Detailed Description — 670
Start Time — 680
End Time — 690
Total Time — 695

[Pause] [End] [Erase]

FIG. 6

TIMEKEEPER ENTRY BOX™

| Field | Value | Ref |
|---|---|---|
| Date | 01-01-04 | 710 |
| Client Identifier |  | 720 |
| Personal Code |  | 730 |
| Document Type | E-mail | 740 |
| Author(s) | John Doe | 750 |
| Recipient(s) | Sandy Johnson | 760 |
| Detailed Description | Draft e-mail to Client re meeting | 770 |
| Start Time | 11:45 am | 780 |
| End Time |  | 790 |
| Total Time |  | 795 |

Buttons: — ▢ Pause | End | Erase

REALTIME BILLABLE TIMEKEEPER METHOD, SYSTEM AND APPARATUS

FIELD OF THE INVENTION

The present invention relates to a timekeeping and tracking computer method, system and apparatus on a document-by-document, task-by-task, realtime basis for the purpose of generating associated billing information for an individual services-related professional. The invention also permits the individual to control the time allocated and the description for each document, whether Internet-based or local area network (LAN) based, or task, on a realtime basis through a timekeeper entry box generated for each such document and task.

BACKGROUND OF THE INVENTION

Electronic time and billing and/or cost systems have evolved from the traditional time log manually recorded on blank sheets of paper or on pre-formatted paper forms. Such systems have been in a constant state of flux and evolution since the introduction of computer technology into the professional working environment.

Today, virtually one hundred percent of the documents that are generated and stored in professional offices are computer generated. The need for a realtime computer generated time and billing system for the individual professional is thus essential in today's working environment. This is particularly true for attorneys and other service-related professionals who bill clients based on an hourly rate for time spent on a particular matter where hourly rates vary for each professional, and thus, it is essential to record and bill each professional's time on an individual basis.

Moreover, in an increasingly cost conscious environment, clients have justifiably mandated strict guidelines and specific support for all time billed down to the minute. This has increased the burden on professionals such as attorneys to keep a running track record of every hour, every minute, of their billable time and to provide adequate justification for such billable time on a daily basis. Many attorneys and other billing professionals do not record time expended for rendering professional services contemporaneous with the task or service performed. This results in time being lost and never billed due to the inability to remember the task performed or the amount of time spent for performing the task. The absence of a computer system which monitors billable time for every document generated and/or task undertaken during the course of a given day contemporaneous with the service being performed has proven to be an insurmountable burden for many professionals who have a difficult time administratively logging their time on a daily basis.

Unfortunately, while there have been numerous attempts to improve existing time and billing systems, none have addressed the need for a timekeeping tracking computer system, method and apparatus on a document-by-document, task-by-task, realtime basis for the purpose of generating a daily billing report for an individual service-related professional. For example, U.S. Pat. No. 5,991,742, entitled "Time and Expense Logging System", is directed to a portable time and billing system for professionals who are constantly on their feet, do not have access to desktop or notebook computers and may not have typing skills or familiarity with operating a computer. The '742 patent is directed to a computer system which accepts data from the user using an input recognizer such as a handwriting recognizer or speech recognizer.

Other computer systems are directed to overall billkeeping or litigation management or cost budgeting. U.S. Pat. No. 6,622,128, entitled "Internet-based attorney-client billing system" is directed to an Internet-based billkeeping and litigation management system, allowing third parties to monitor the progress and expense of litigation and/or possibly other legal matters.

U.S. Patent Application Publication No. 20030225989, entitled "System for calculating billable time" is directed to a timing system for tracking the time spent on a client file for cost budget purposes. The timing system does not address the tracking of billable time for an individual professional on a document-by-document, task-by-task, realtime basis for the purpose of generating a daily billing report for that individual professional. The timing system also is not directed to monitoring each newly generated document, whether Internet-based or LAN based, or task of an individual professional on a daily basis.

SUMMARY OF THE INVENTION

The present invention relates to a timekeeping and tracking computer method, system and apparatus on a document-by-document, task-by-task, realtime basis for the purpose of generating a daily billing report for an individual services-related professional. The manner by which the computer method, system and apparatus may generate, track and record time may be through the use of a software program that generates a timekeeper entry box each time a document or task is being performed by the professional. The timekeeper entry box may appear on the professional's computer screen for each document, task or other service (LAN or Internet-based) performed by the professional. The timekeeper entry box may include a field for entry of a client identifier (client name or billing number). The timekeeper entry box may also include additional fields for entry of information, such as date, document type, description of task being performed and billing professional identifier. The timekeeper entry box may automatically appear on the professional's computer screen every time the professional is working on a computer based task—LAN document or Internet-based task. The information included in the fields in the timekeeper entry box may either be extracted whereby the invention automatically extracts the information from the document or other task being performed by the professional or can be input by the professional as he or she is performing the document or task.

The invention may read the document profile created for each LAN document in order to extract pertinent information for the timekeeper entry box. The billing professional may also manually type in the pertinent information into the timekeeper entry box as the professional is performing that service. In the case of a Internet-based service such as e-mail or research, the system may read certain tagged or designated fields in order to extract pertinent information for the timekeeper entry box. The billing professional may also manually type in the pertinent information into the timekeeper entry box, as the billing professional is performing that service.

The time computation feature in the timekeeper entry box will automatically start upon creation of a LAN document by the professional or upon commencement of a Internet-based task such as E-mail or a research session. The time computation function will automatically cease upon closing of the LAN document, upon sending, saving or closing the e-mail, and upon cessation of the research session or other task by closing out of the session.

The timekeeper entry box may also include command buttons which the billing professional can use to control the time computation function as well as other functions related to the timekeeper entry box. These command buttons may function to "Pause", "Erase", "End", "Maximize" and "Minimize", or function to perform any other command necessary for efficient billable timekeeping. For example, if the professional is performing a research session on Lexis/Nexis and is interrupted with a phone call on another matter, the professional can click the Pause button on the timekeeper entry box for the research session. This will pause the time computation function until the billing professional clicks on pause again to restart or resume the time computation function.

In another embodiment, the invention may detect a lack of mouse, keyboard and/or other interaction activity, and may automatically pause billing for the task.

The invention generates a daily time and billing report for an individual professional which can either be uploaded and viewed on the computer screen or printed for review and/or revision. The report may contain the following information: date, name of billing attorney or billing professional, and for each document generated or task, the client identifier, subject of document or description of task, time expended (start and end time and total time converted into the standard billing increments utilized by the firm or company, such as tenth of an hour or quarter of an hour). The report may also combine time calculations relating to the same document or task (e.g., an individual may work on the same document or task at different times during the same day) in order to generate a cumulative billing entry for that document or task, or may combine time calculations for same client matters or may combine time calculations following other programmed instructions. The invention may also generate a summary report based on any specific subject matter category, or combination of categories selected, or for a particular client. Moreover, the information generated by the report can be entered directly into the firm's or company's existing accounting or billing system used for generating billing invoices for professional services rendered to clients.

In another embodiment of the invention, there is a telephone and means operatively associated with the telephone for detecting when the telephone is in use and generating a signal in response to the in use. A CPU is operatively associated with the detecting means and has software associated with the detecting means for enabling the timekeeper entry box to track time and billing information for telephone calls initiated or received by an individual professional on a daily basis.

It will be appreciated by those skilled in the art that the foregoing brief description and the following detailed description are exemplary and explanatory of the invention, but are not intended to be restrictive thereof or limiting of the advantages which can be achieved by the invention. Thus, the accompanying drawings, referred to herein and constituting a part hereof, illustrate preferred embodiments of this invention, and, together with the detailed description, serve to explain the principles of this invention.

BRIEF DESCRIPTION OF THE DRAWINGS

The features and advantages of the present invention, both as to its structure and operation, will be apparent from the following detailed description, especially when taken in conjunction with the accompanying drawings, wherein.

DETAILED DESCRIPTION OF THE INVENTION

A realtime billable timekeeper program implemented in software or hardware or both is provided to be used by individual service-related professionals, such as attorneys, on a computer, desktop, notebook, palm pilot, handheld or like device to track the billable time spent by an individual professional on a document-by-document, task-by-task basis contemporaneous with the service being performed, for the purpose of generating a daily billing report for such individual. The program may have particular applicability to those professionals who bill clients on an hourly rate basis, particularly where hourly rates vary for each professional.

A person skilled in the art will understand that the present invention may be supplemented in various forms of hardware, software, or a combination thereof. In one embodiment, the present invention may be implemented in software as an application program tangibly embodied on a program storage device. The application program may be uploaded to and executed by a computer device comprising any suitable architecture such as that shown in FIG. 1.

Figure 1:
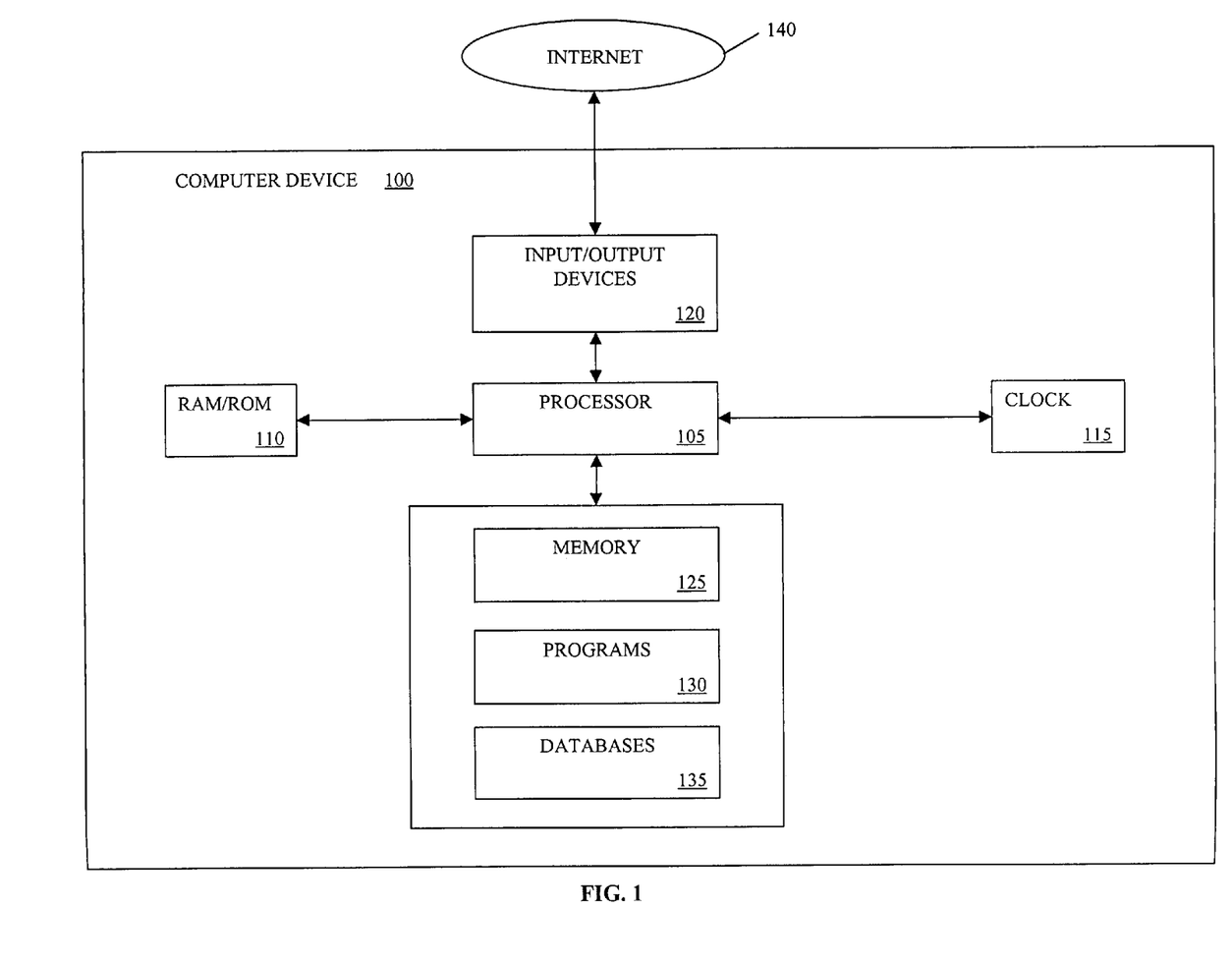
FIG. 1 is a block diagram of an embodiment of a computer device that can be used in the invention.

Turning now to FIG. 1, illustrated thereon are exemplary components of a computer device 100 for use in the invention. The primary component of computer device 100 is processor (CPU) 105, which may be any commonly available microprocessor. Processor 105 may be operatively connected to further exemplary components, such as random access memory (RAM)/read-only memory (ROM) 110, clock 115, input/output devices 120 and memory 125 which, in turn, stores one or more computer programs 130 and databases 135.

Processor 105 operates in conjunction with RAM and ROM. The RAM portion of RAM/ROM 110 may be a suitable number of Single In-Line Memory Module (SIMM) chips having a storage capacity (typically measured in kilobytes or megabytes) sufficient to store and transfer, inter alia, processing instructions utilized by processor 105 which may be received by application programs 130. The ROM portion of RAM/ROM 110 may be any permanent non-rewritable memory medium capable of storing and transferring, inter alia, processing instructions performed by processor 105.

Clock 115 may be an on-board component of processor 105 which dictates a clock speed (typically measured in MHz) at which processor 105 performs and synchronizes, inter alia, communication between the internal components of computer device 100.

Input/output devices 120 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to present data to an operator of computer device 100 or to transmit data over Internet 140. Accordingly, suitable output devices may include a display, a printer and a voice synthesizer connected to a speaker.

Other input/output devices may include a telephone or network connection device, such as a telephone modem, a cable modem, a T-1 connection, a digital subscriber line or a network card, for communicating data to and from other computer devices over Internet 140. Input/output devices can have capacity to handle high bandwidth traffic in order to accommodate communications with a large number of visitors.

Memory 125 may be an internal or external large capacity device for storing computer processing instructions, computer-readable data, and the like. The storage capacity of memory 125 is typically measured in megabytes or gigabytes. Accordingly, memory 125 may be one or more of the following: a floppy disk in conjunction with a floppy disk drive, a hard disk drive, a CD-ROM disk and reader/writer, a DVD disk and reader/writer, a ZIP disk and a ZIP drive, and/or any other computer readable medium that may be encoded with processing instructions in a read-only or read-write format. Further functions of and available devices for memory 125 will be apparent.

Memory 125 may store, inter alia, a plurality of programs 130, such as the realtime software billable timekeeper program of the invention. Memory 125 also includes databases 135 comprising multiple blocks of information such as the realtime billing entries of an individual professional on a document-by-document, task-by-task basis and for any given time period, including on a daily basis.

The realtime software billable timekeeper program interfaces with any Internet-based or LAN application program that generates a file, e.g., Microsoft Word®, Microsoft Outlook®, Lotus Notes®, Acrobat Reader®, Adobe Illustration®, Adobe Photoshop®, Adobe Acrobat®, TimeKeeper Desktop®, PCTime®, CMS OPEN®, LexisNexis®, WestLaw® and Internet Explorer® and any other program that generates a file.

Figure 2:
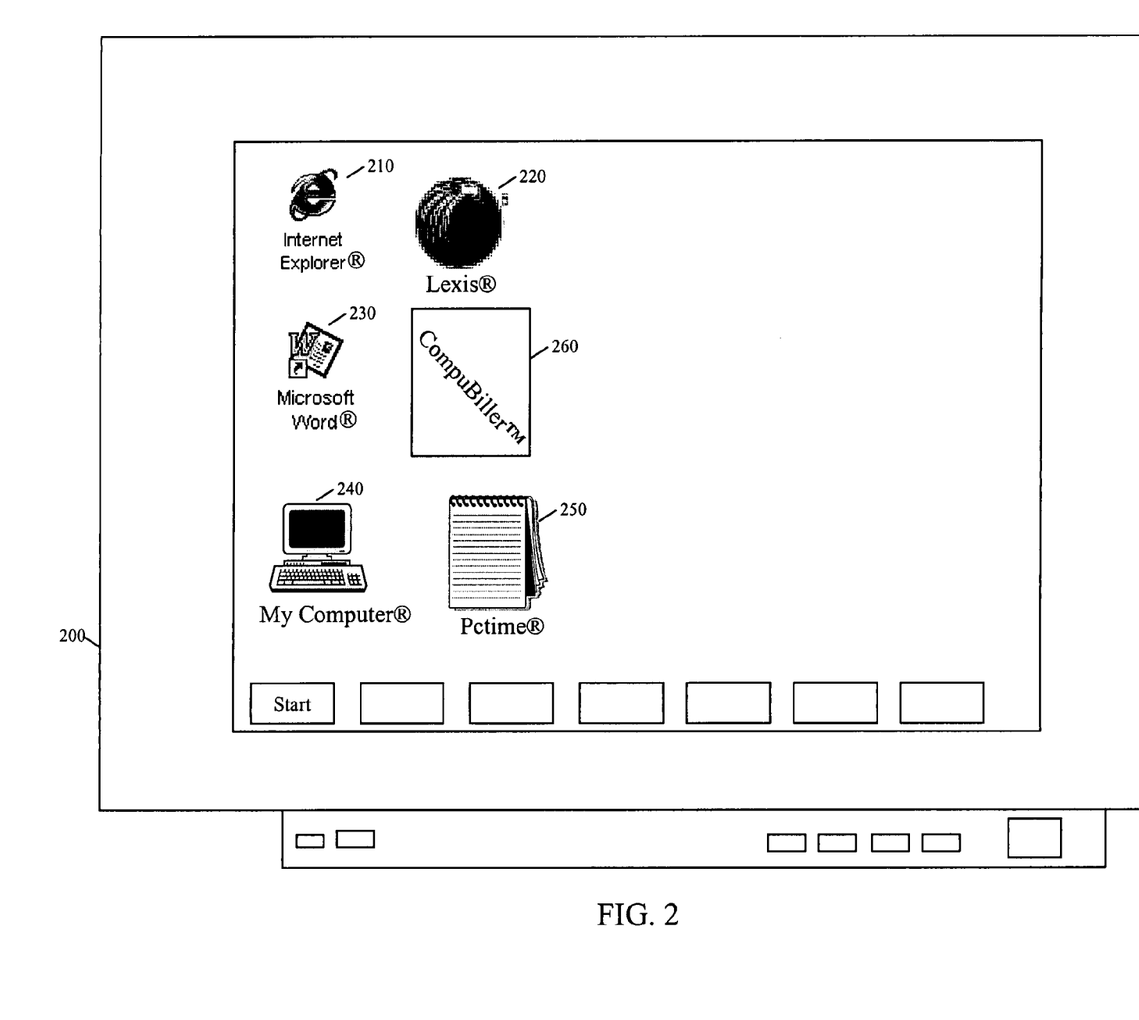
FIG. 2 is an exemplary illustration of the software program icon of the invention (labeled "CompuBiller") among other program icons uploaded on a computer device.

Turning now to FIG. 2, illustrated therein is a computer device 200, here a desktop computer. Visible on the screen of the computer are various icons for program applications, namely Internet Explorer® 210, Lexis® 220, Microsoft Word® 230, My Computer® 240, PC Time® 250 and the software program of the invention, here identified as CompuBiller® 260. Any computer device can be adopted for use in the invention, including, without limitation, desktop, notebook, palm pilot, handheld or like devices. Moreover, the software program of the invention is adaptable for interfacing with any program that generates a file, service or other application for billing purposes.

Figure 3:
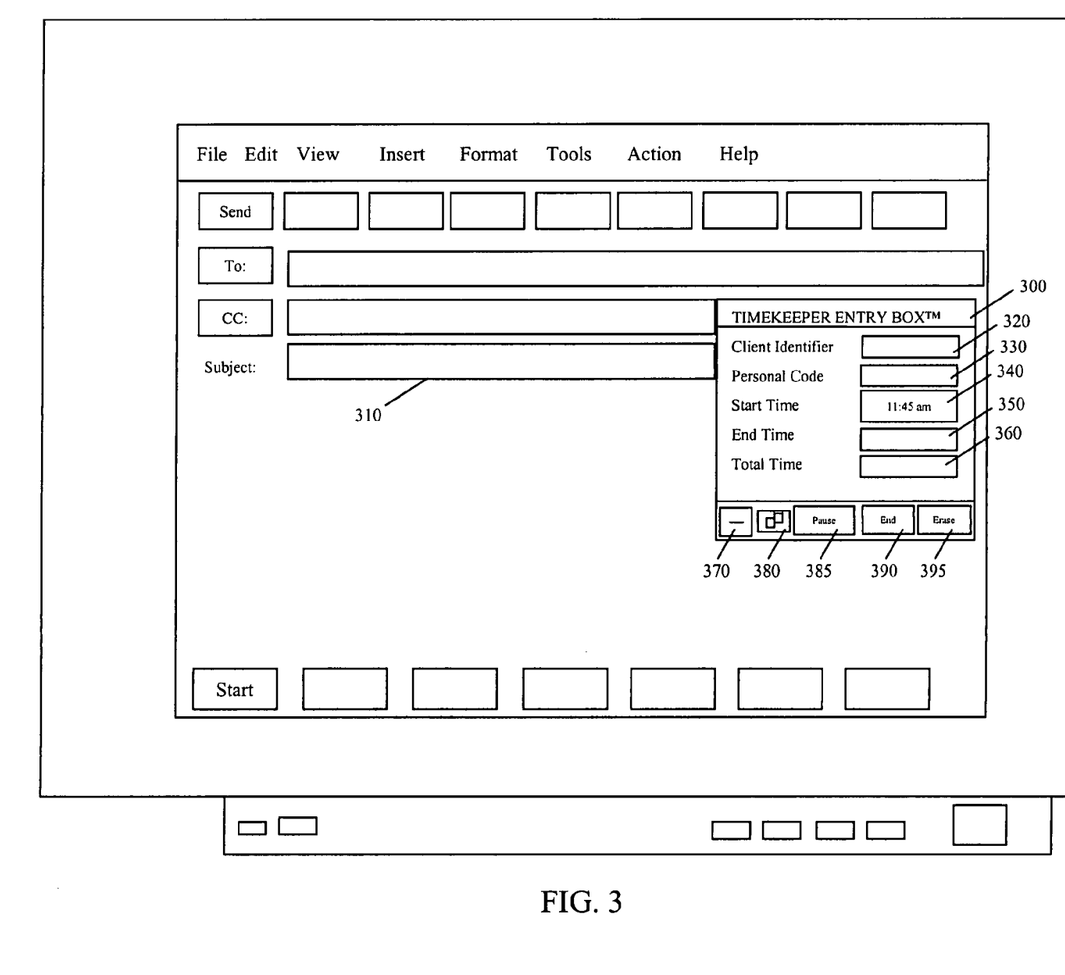
FIG. 3 is an exemplary illustration of a computer screen of a Internet-based e-mail document and the timekeeper entry box.

FIG. 3 is an embodiment of Timekeeper Entry Box™ 300 generated by the software program of the invention for interfacing with a Internet-based document, here e-mail 310, generated by a professional. Timekeeper Entry Box™ 300 is generated contemporaneous with the professional's generation of e-mail 310. In this embodiment, Timekeeper Entry Box™ 300 requires a professional to enter Client Identifier 320 and Personal Code 330. Timekeeper Entry Box™ automatically generates Start Time 340, End Time 350 and Total Time 360. Control command buttons Minimize 370, Maximize 380, Pause 385, End 390 and Erase 395 are also configured in Timekeeper Entry Box™ 300.

Contemporaneous with the opening of e-mail 310, Timekeeper Entry Box™ 300 is generated and billable Start Time 340 commences. The professional has the ability to control certain aspects of the Timekeeper Entry Box™. Minimize button 370 can be activated, for example by clicking on the button with a pointer directed by a mouse or by any other means known to a person skilled in the art. The Minimize button functions to reduce Timekeeper Entry Box™ so that it does not obstruct the view of the Internet-based document, LAN document, task or other service the professional is working on.

Maximize button 380 can be activated to increase the size of the Timekeeper Entry Box™, enabling the professional, for example, to input information into the specified fields on the Timekeeper Entry Box™.

Pause button 385 can be activated at any time while the document is open or during the course of the service to pause the running time clock for billing purposes. For example, if a professional is interrupted (e.g., a phone call on another matter) while working on the document, task or service, the professional can click on the Pause button to prevent the client from being billed for time not spent working on the document, task or service. The professional can resume the running time clock upon returning to work on the document, task or service by, for example, reclicking on the Pause button.

If the professional prefers to limit the amount of billable time allocated to a particular document, service or task, the professional can also click on the End button 390 while the document, service or task is still in session. The End command will terminate the billable time keeping for that particular document, service or task.

Upon termination of the billable session by closing a document, saving a document, sending a document, deleting a document being reviewed, ending a session or task, clicking the End button or by any other means, the program records End Time 350 for the session and Total Time 360. The Timekeeper Entry Box™ closes and the information generated in the box is stored by the program.

To the extent a professional does not want to record billable time with respect to a particular document, service or task, the professional can click on Erase button 395. The Erase command functions to delete the Timekeeper Entry Box™ so that no information or time relating to a particular document, task or session is stored.

In another embodiment, a professional may be given the option of recording billable time for a particular document, service or task. A precursor request can be configured to appear prior to displaying the Timekeeper Entry Box™, requesting the professional whether the document, service or task should be billed. The professional has the option of billing time to the document, service or task session, whereupon the Timekeeper Entry Box™ is generated, or proceeding without activating the Timekeeper Entry Box™ so that no billable time will be recorded for such session.

The software program of the invention can also be configured to apply only to selected documents, services and/or tasks performed by a professional. For example, in the case of attorneys, the software program may only be configured to apply to the legal memoranda generated, edited and/or reviewed by an attorney as well as legal research sessions undertaken on LexisNexis®, WestLaw® or the like but will not be activated for e-mail use.

Figure 4:
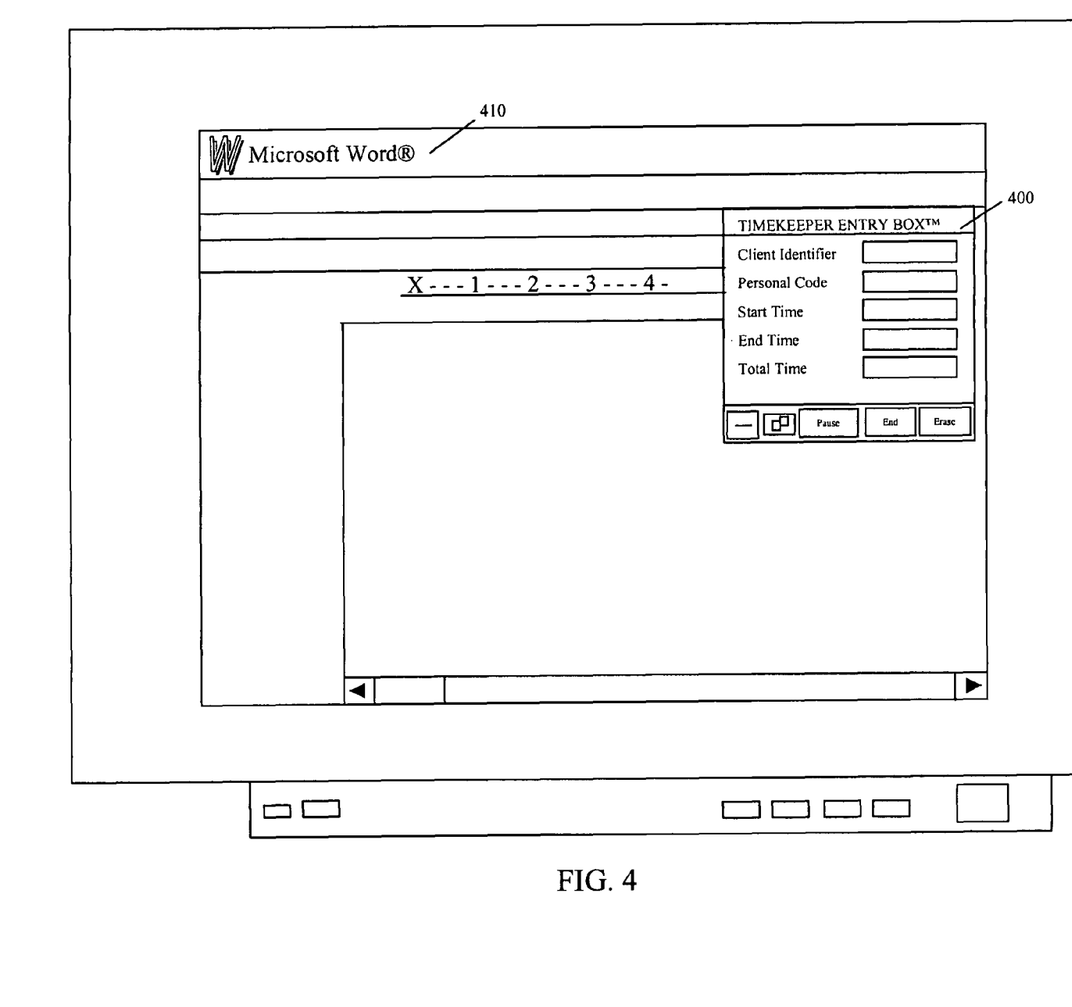
FIG. 4 is an exemplary illustration of a computer screen of a LAN-based Microsoft Word document and the timekeeper entry box.

FIG. 4 is an embodiment of Timekeeper Entry Box™ 400 generated contemporaneous with a professional's generation of a Microsoft Word® LAN-based document 410. The invention can be employed with any Internet-based or LAN-based documents or services or tasks performed by a professional using a computer device. Moreover, the invention is applicable to such documents, services or tasks generated, received or reviewed by a professional.

Figure 5:
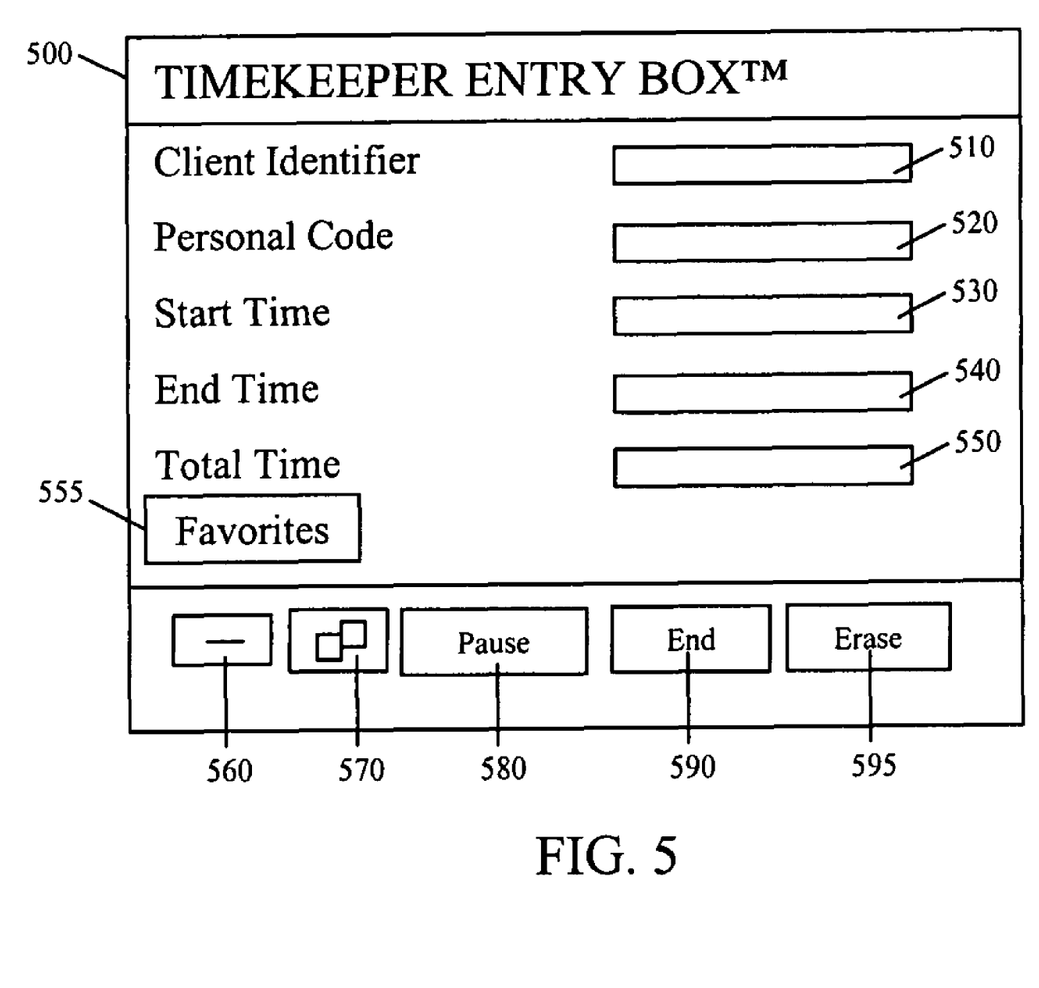
FIG. 5 is an exemplary illustration of a timekeeper entry box.

FIG. 5 is an exemplary configuration of Timekeeper Entry Box™ 500 that is generated by the software program of the invention contemporaneously with the initiation of any document, service or task using a computer. Timekeeper Entry Box™ 500 may be configured to include any user input information and/or automatically extracted information relating to the document, service or task for the purpose of generating a contemporaneous billable time report for an individual professional. Timekeeper Entry Box™ 500 may also include one or more command functions permitting the user to control aspects of the billable timekeeping mechanism, as well as a favorites function which may include present client matter information for incorporation in the timekeeper entry box.

Another feature of the Timekeeper Entry Box™ is the visual aspect of the box to a professional. The fact that the box will appear on a contemporaneous basis with each document, service and/or task performed by the professional will encourage the professional to account for billable time on a contemporaneous basis with services provided. Moreover, the box also provides a visual of billable time tracked by the invention for each document, service and/or task.

In this embodiment, Timekeeper Entry Box™ 500 incorporates the following information: Client Identifier 510, Personal Code 520, Start Time 530, End Time 540, Total Time 550. The client identifier may include any number of letters, numerals and/or other characters to identify a specific client. The personal code may include any number of letters, numerals and/or characters to identify a specific professional individual. The start time may be the time the document, session and/or task commences; the end time may be the time the document, session and/or task concludes; and the total time is the time difference between the start time and the end time. The Timekeeper Entry Box™ may also include a running clock visual to the professional so that the professional is informed of the time spent on a particular service at any moment.

Timekeeper Entry Box™ 500 also includes Favorites button 555, Minimize button 560, Maximize button 570, Pause button 580, End button 590 and Erase button 595. Command functions can be configured in any manner in the box and any number of commands may be utilized as suitable to a professional individual.

Figure 6:
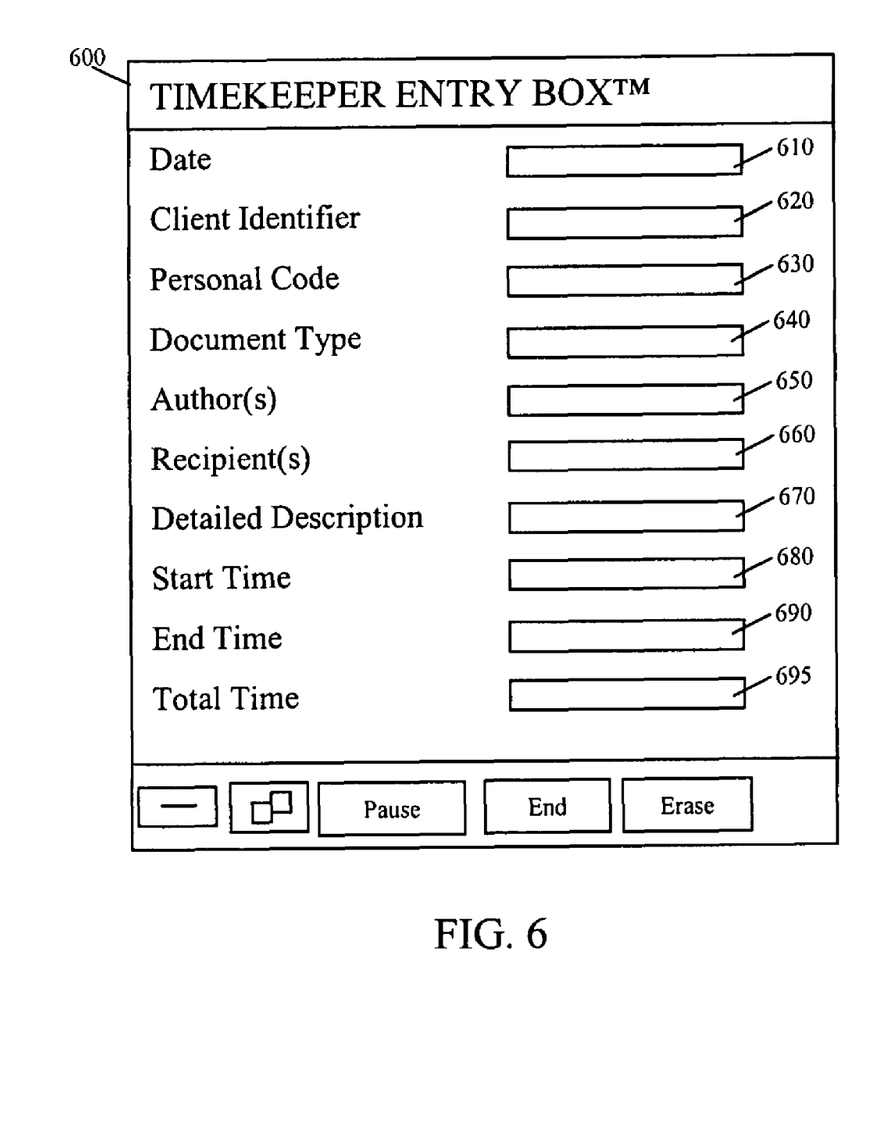
FIG. 6 is an exemplary illustration of a timekeeper entry box including fields for inputting pertinent billing information.
Figure 7:
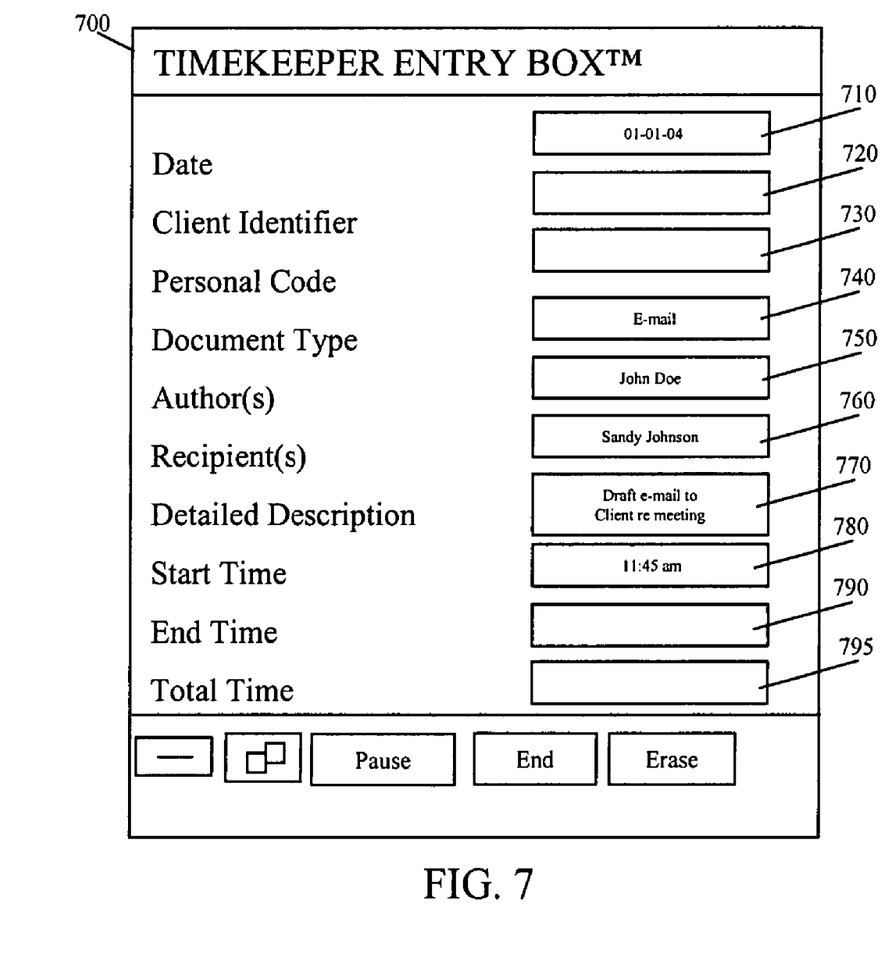
FIG. 7 is an exemplary illustration of a timekeeper entry box including extracted information pertinent to a billing entry.

FIGS. 6 and 7 are further embodiments of the Timekeeper Entry Box™. The Timekeeper Entry BOX™ can be configured to require a professional's input of information in each of the fields contained therein, automatically extract information relating to a document, session or task for incorporation into the box and/or require a professional's input for certain information and automatically extract other information for incorporation into the box.

In FIG. 6, Timekeeper Entry Box™ 600 requires a professional to input Date 610, Client Identifier 620, Personal Code 630, Document Type 640, document Author(s) 650, document Recipient(s) 660, Detailed Description 670 of document, service or task, Start Time 680, End time 690 and Total Time 695.

In FIG. 7, certain information is required to be input by a professional and certain information has been automatically extracted by the software program of the invention for incorporation in Timekeeper Entry Box™ 700. Information to be input are Client Identifier 720 and Personal Code 730. Extracted information are Date 710, Document Type 740, Author(s) 750, Recipient(s) 760, Detailed Description 770 and Start Time 780. In addition, End Time 790 and Total Time 795 will be automatically extracted by the software program upon completion of the document, service or task.

Figure 8:
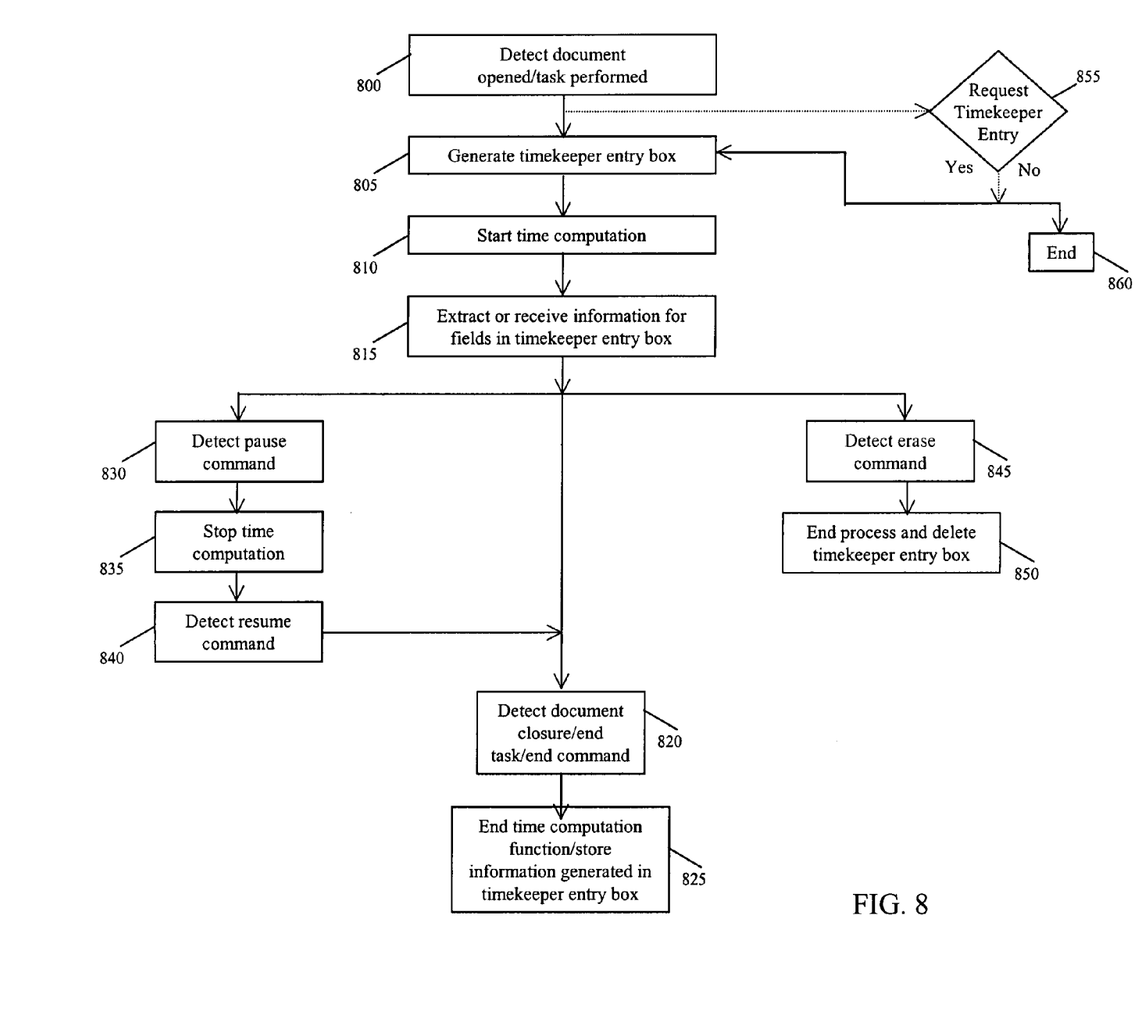
FIG. 8 is a flow chart illustrating an embodiment of the method for implementing a realtime billing process.

FIG. 8 is an embodiment of a flow scheme of the invention. In Step 800, the invention detects that a document is opened or the initiation of a service or task. In Step 805, the invention generates a Timekeeper Entry Box™ contemporaneous with the opening of the document or initiation of service/task. In Step 810, upon opening the timekeeper entry box, the invention automatically starts the time computation corresponding to the specific professional service undertaken by the individual professional. In Step 815, the invention extracts and/or receives input information for incorporation in the timekeeper entry box to define the billable item for the service being performed. In Step 820, the invention detects that the document has been closed, saved and/or sent, or the service/task has been completed or an end command. Upon detecting that the document has been closed, saved or sent, or the service/task has been completed or an end command, the invention ends the time computation, and stores the information generated in the timekeeper entry box in Step 825.

Alternatively, during the service being performed, the invention may detect a pause command as in Step 830. Upon detecting a pause command, the invention stops the time computation in Step 835, and upon detecting a resume command 840, the invention resumes the time computation relating to the specific document and/or service/task being performed by the individual professional.

In Step 845, the invention may also detect an erase command, upon which the invention ends the process and deletes the timekeeper entry box in Step 850. No information relating to this service is stored by the invention.

In addition, prior to generating a timekeeper entry box relating to a particular service, an individual professional may be requested in Step 855 whether the service should be billed and, consequently, a timekeeper entry box should be generated. If the individual professional requests that the service be billed, a timekeeper entry box is generated. If the individual professional chooses not to bill a client for a particular service, the timekeeping session is terminated in Step 860, and no billable time is recorded for this particular service.

Figure 9:
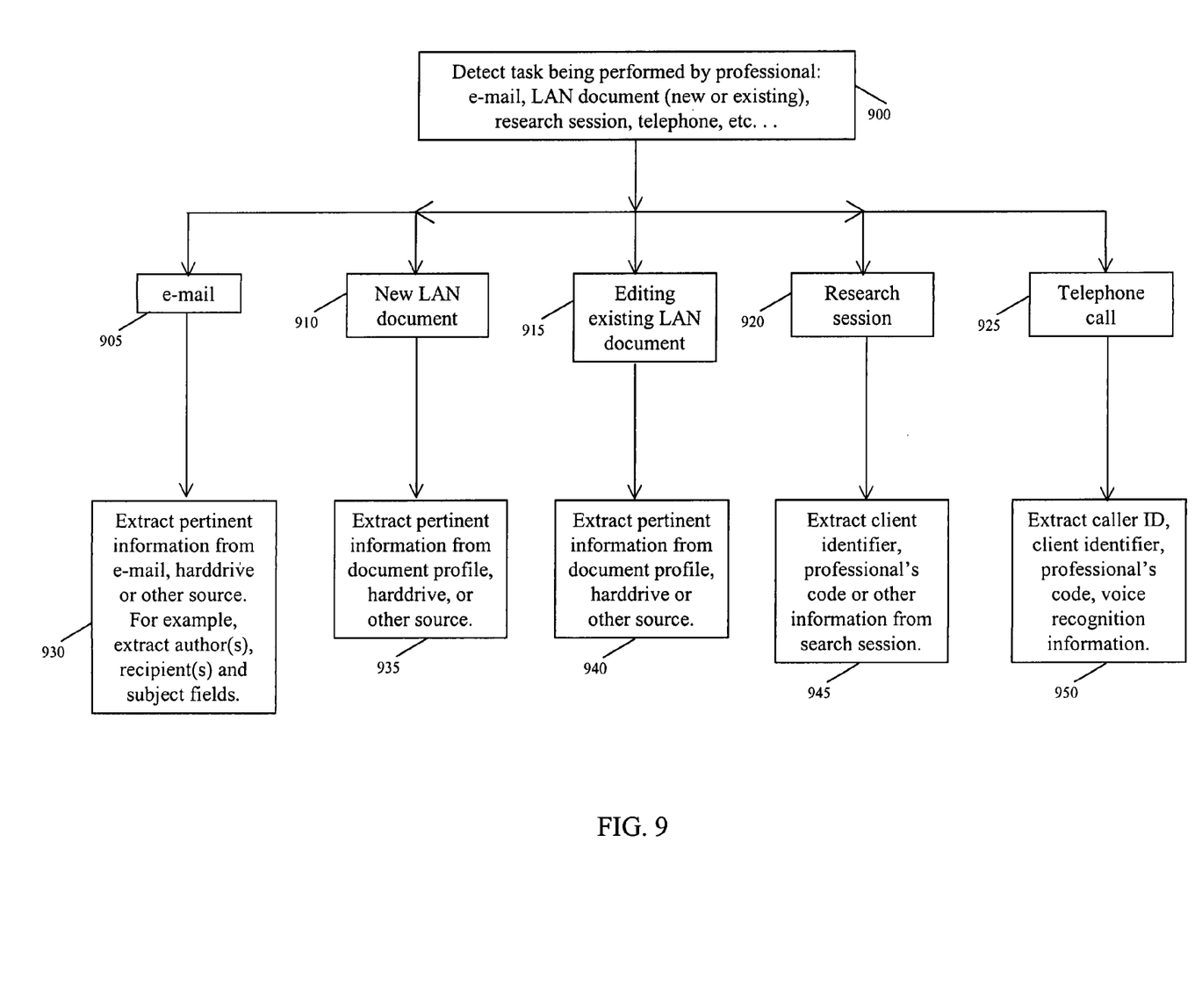
FIG. 9 is a flow chart illustrating an embodiment of the method of extracting pertinent billing information for inclusion in the timekeeper entry box.

The software program of the invention further is capable of detecting the service or task being performed by the individual professional and extracting pertinent information relating to each type of search being performed for inclusion in the "Timekeeper Entry Box™". As such, the pertinent information extracted may differ depending upon the task being performed. FIG. 9 is a flow diagram setting forth the detection/extraction steps undertaken by an embodiment of the invention.

In FIG. 9, the invention detects the task being performed by the professional in Step 900. The task may comprise drafting, reviewing or editing a Internet-based document, such as an e-mail, drafting, reviewing or editing a LAN based document, a research session, making or receiving a telephone call or any other billable service undertaken by a professional. Depending upon the type of task detected, e.g., drafting, reviewing or editing an e-mail (Step 905), drafting, reviewing or editing a newly generated LAN document (Step 910), editing an existing LAN document (Step 915), research session (Step 920) or making or receiving a telephone call (Step 925), the invention is configured to extract particular information for inclusion in the "Timekeeper Entry Box™" depending upon the form of the task or service performed.

For example, in Step 930, the invention detects a service being performed relating to an e-mail and extracts pertinent information from the e-mail headers or the harddrive or other source relating to the e-mail. The extracted information may be verified and/or used to look up matter identifying data in a database, address book, and/or the like. Such information may be the author(s), recipient(s), subject and/or date of the e-mail.

In Step 935, the invention detects a new LAN document being generated by a professional individual and extracts pertinent information from the document's profile or harddrive or other source relating to the newly generated LAN document.

In Step 940, the invention detects the editing of an existing LAN document and extracts pertinent information from the document's profile, metadata or harddrive or other source relating to the edited document.

In Step 945, the invention detects a research session and extracts a client identifier, professional's code or other pertinent information from the search session.

In Step 950, the invention detects a telephone call and extracts a caller ID, client identifier, professional's code, voice recognition information or other pertinent information relating to the telephone call. The extracted information may be verified and/or used to look up matter identifying data in a database, address book, and/or the like.

Figure 10:
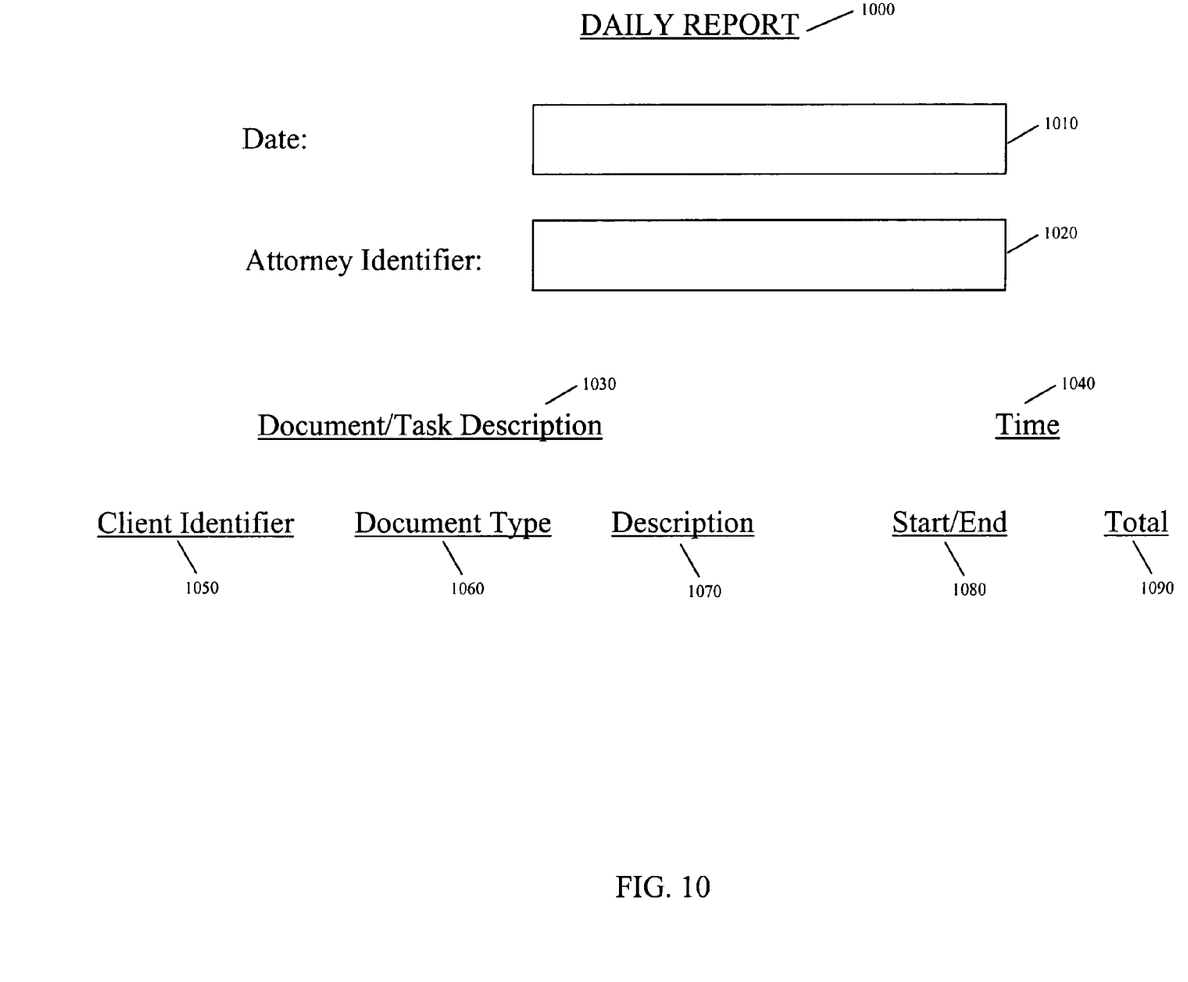
FIG. 10 is an exemplary illustration of the format of a daily report generated by the invention based on a compilation of stored timekeeper entry boxes for an individual professional.

FIG. 10 is an embodiment of "Daily Report" 1000 on Date 1010 for attorney 1020 generated by the invention based on the billable services performed by the attorney. The report that is generated is specific to the attorney's billable services for that date and compiles all information stored from the timekeeper entry boxes generated on that date. As the report shows the information compiled for each billable service or task undertaken by the attorney for that date, includes for Document/Task Description 1030, a Client Identifier 1050, Document Type 1060, Description 1070, and for corresponding Time 1040, a Start/End time 1080 and Total time 1090.

The invention can be configured to generate a billable report for an individual professional for any length of time, and can categorize and/or subcategorize the billable time entries in any suitable manner, e.g., by client or service. The invention can also be configured such that the report is transmitted, received and incorporated into any LAN application program that generates a file for billing purposes.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described in portions thereof and this invention should be defined in accordance with the claims which follow.

The invention claimed is:

1. A method for individual realtime billable timekeeping using a computer, comprising a computer program for:
   detecting opening of at least one document; and
   generating an individual timekeeper entry box including an entry for a personal code and a second entry for a client identifier corresponding to said at least one document wherein said individual timekeeper entry box contemporaneously tracks time associated with said personal code and said client identifier said document is in use to track time for an individual by client on a document by document basis using the computer.

2. The method of claim 1, wherein said individual timekeeper entry box includes said personal code.

3. The method of claim 1, further comprising receiving at least one of a document type, an author identifier, a recipient identifier and a subject description for entry within said individual timekeeper entry box.

4. The method claim 1, wherein said individual timekeeper entry box includes at least one of the following functions: pause, end, erase, minimize, maximize and favorites.

5. The method, of claim 1, further comprising storing information obtained from said individual timekeeper entry box.

6. The method of claim 1, further comprising integrating information obtained from said individual timekeeper entry box into an accounting and billing system.

7. The method of claim 1, further comprising displaying at least one of a start time, an end time, a total time, a date, a client identifier, a personal code, a document type, an author identifier, a recipient identifier, and a subject description within said individual timekeeper entry box.

8. The method of claim 1, further comprising displaying a running clock within said individual timekeeper entry box.

9. The method of claim 1, further comprising requesting permission to track time of said document.

10. A computing device for an individual realtime billable timekeeper, comprising:
    a storage device; and
    a processor connected to said storage device, said storage device storing a program for controlling said processor; said processor operative with said program to,
    detect opening of at least one document; and
    generate an individual timekeeper entry box including an entry for a personal code and a second entry for a client identifier corresponding to said at least one document wherein said individual timekeeper entry box contemporaneously tracks time associated with said personal code and said client identifier said document is in use to track time for an individual by client on a document by document basis.

11. The computing device of claim 10, wherein said individual timekeeper entry box includes said personal code.

12. The computing device of claim 10, wherein said processor is further operative with said program to receive at least one of a document type, an author identifier, a recipient identifier and a subject description for entry within said individual timekeeper entry box.

13. The computing device of claim 10, wherein said individual timekeeper entry box includes at least one of the following functions: pause, end, erase, minimize, maximize and favorites.

14. The computing device of claim 10, wherein said processor is further operative with said program to store information obtained from said individual timekeeper entry box.

15. The computing device of claim 10, wherein said processor is further operative with said program to display at least one of a start time, an end time, a total time, a date, a client identifier, a personal code, a document type, an author identifier, a recipient identifier, and a subject description within said individual timekeeper entry box.

16. The computing device of claim 10, wherein said processor is further operative with said program to display a running clock within said individual timekeeper entry box.

17. The computing device of claim 10, wherein said processor is further operative with said program to request permission to track time of said document.

18. A computer readable medium having computer executable software code stored thereon for an individual realtime billable timekeeper, comprising:
   code for detecting opening of at least one document;
   code for generating an individual timekeeper entry box including an entry for a personal code and a second entry for a client identifier corresponding to said at least one document wherein said individual timekeeper entry box contemporaneously tracks time associated with said personal code and said client identifier said document is in use to track time for an individual by client on a document by document basis.

19. The computer readable medium of claim 18, wherein said individual timekeeper entry box includes said personal code.

20. The computer readable medium of claim 18, further comprising code for receiving at least one of a document type, an author identifier, a recipient identifier and a subject description for entry within said individual timekeeper entry box.

21. The computer readable medium of claim 18, wherein said individual timekeeper entry box includes at least one of the following functions: pause, end, erase, minimize, maximize and favorites.

22. The computer readable medium of claim 18, further comprising code for storing information obtained from said individual timekeeper entry box.

23. The computer readable medium of claim 18, further comprising code for displaying at least one of a start time, an end time, a total time, a date, a client identifier, a personal code, a document type, an author identifier, a recipient identifier, and a subject description within said individual timekeeper entry box.

24. The computer readable medium of claim 18, further comprising code for displaying a running clock within said individual timekeeper entry box.

25. The computer readable medium of claim 18, further comprising code for requesting permission to track time of said document.

26. A method for individual realtime billable timekeeping using a computer, comprising a computer program for:
   detecting initiation of at least one client service; and
   generating an individual timekeeper entry box including an entry for a personal code and a second entry for a client identifier corresponding to said at least one client-service wherein said individual timekeeper entry box contemporaneously tracks time associated with said personal code and said client identifier of said client-service to track time for an individual by client on a client-service by client-service basis using the computer.

27. A computing device for an individual realtime billable timekeeper, comprising:
   a storage device; and
   a processor connected to said storage device, said storage device storing a program for controlling said processor;
   said processor operative with said program to,
   detect initiation of at least one client-service; and
   generate an individual timekeeper entry box including an entry for a personal code and a second entry for a client identifier corresponding to said at least one client-service wherein said individual timekeeper entry box contemporaneously tracks time associated with said personal code and said client identifier of said client-service to track time for an individual by client on a client-service by client-service basis.

28. A computer readable medium having computer executable software code stored thereon for an individual realtime billable timekeeper, comprising:
   code for detecting initiation of at least one client-service; and
   code for generating an individual timekeeper entry box including an entry for a personal code and a second entry for a client identifier corresponding to said at least one client-service wherein said individual timekeeper entry box contemporaneously tracks time associated with said personal code and said client identifier of said client-service to track time for an individual by client on a client-service by client-service basis.

29. A method for individual realtime billable timekeeping using a computer, comprising a computer program for:
   detecting initiation of at least one telephone call; and
   generating an individual timekeeper entry box including an entry for a personal code and a second entry for a client identifier corresponding to said at least one telephone call wherein said individual timekeeper entry box contemporaneously tracks time associated with said personal code and said client identifier of said telephone call to track time for an individual by client on a telephone call by telephone call basis using the computer.

30. A computing device for an individual realtime billable timekeeper, comprising:
   a storage device; and
   a processor connected to said storage device, said storage device storing a program for controlling said processor:
   said processor operative with said program to,
   detect initiation of at least one telephone call; and
   generate an individual timekeeper entry box including an entry for a personal code and a second entry for a client identifier corresponding to said at least one telephone call wherein said individual timekeeper entry box contemporaneously tracks time associated with said personal code and said client identifier of said telephone call to track time for an individual by client on a telephone call by telephone call basis.

31. A computer readable medium having computer executable software code stored thereon for an individual realtime billable timekeeper, comprising:
   code for detecting initiation of at least one telephone call; and
   code for generating an individual timekeeper entry box including an entry for a personal code and a second entry for a client identifier corresponding to said at least one telephone call wherein said individual timekeeper entry box contemporaneously tracks time associated with said personal code and said client identifier of said telephone call to track time for an individual by client on a telephone call by telephone call basis.

32. The method of claim 1, further comprising simultaneously tracking time for said individual on said at least one document and at least one of a client-service and a telephone call.

33. The method of claim 26, further comprising simultaneously tracking time for said individual on said at least one client-service and at least one of a document and a telephone call.

34. The method of claim 29, further comprising simultaneously tracking time for said individual on said at least one telephone call and at least one of a document and a client-service.

35. The method of claim 26, wherein said individual timekeeper entry box includes said personal code and upon receipt of said client identifier contemporaneously tracks time associated with said personal code and said client identifier of said client-service.

36. The computing device of claim 27, wherein said timekeeper entry box includes said personal code.

37. The computer readable medium of claim 28, wherein said timekeeper entry box includes said personal code.

38. The method of claim 29, wherein said timekeeper entry box includes said personal code.

39. The computing device of claim 30, wherein said timekeeper entry box includes said personal code.

40. The computer readable medium of claim 31, wherein said timekeeper entry box includes said personal code.

* * * * *